US010988964B2

(12) United States Patent
Keller et al.

(10) Patent No.: US 10,988,964 B2
(45) Date of Patent: Apr. 27, 2021

(54) VEHICULAR HINGE ASSEMBLY

(71) Applicant: GRAMMER AG, Ursensollen (DE)

(72) Inventors: Hubert Keller, Kummersbruck (DE); Andreas Baer, Amberg (DE)

(73) Assignee: GRAMMER AG, Ursensollen (DE)

( * ) Notice: Subject to any disclaimer, the term of this patent is extended or adjusted under 35 U.S.C. 154(b) by 13 days.

(21) Appl. No.: 15/954,243

(22) Filed: Apr. 16, 2018

(65) Prior Publication Data

US 2018/0305962 A1 Oct. 25, 2018

(30) Foreign Application Priority Data

Apr. 21, 2017 (DE) .......................... 102017003860.0

(51) Int. Cl.
*E05D 5/12* (2006.01)
*F16C 43/02* (2006.01)
(Continued)

(52) U.S. Cl.
CPC ............... *E05D 5/127* (2013.01); *B60N 2/02* (2013.01); *B60N 2/933* (2018.02); *E05D 3/125* (2013.01);
(Continued)

(58) Field of Classification Search
CPC ... E05D 5/127; E05D 3/125; E05D 2005/102; E05D 2005/108; Y10T 16/527; Y10T 16/5275; Y10T 16/528
See application file for complete search history.

(56) References Cited

U.S. PATENT DOCUMENTS 2,261,146 A * 11/1941 Dow
2,362,923 A * 11/1944 Pardoe ...................... E05D 5/10
16/330

(Continued)

FOREIGN PATENT DOCUMENTS

CH 669243 A5 * 2/1989 ........... E05D 7/1005
DE 2350304 A1 * 4/1975 ........... E05D 7/1005
(Continued)

*Primary Examiner* — Victor D Batson
*Assistant Examiner* — Matthew J Sullivan
(74) *Attorney, Agent, or Firm* — Andrew Wilford

(57) ABSTRACT

The invention relates to a hinge comprising a first part (11) that can be pivoted relative to a second part (12) about a pivot axis (a), wherein the first part (11) comprises at least one bore (13) and the second part (12) at least one recess (15*a*, 15*b*), wherein, in a final assembly position, at least pin one (17*a*, 17*b*) that is coaxial to the pivot axis (a), has a first longitudinal portion in the bore (13) and with a second longitudinal portion in the recess (15*a*, 15*b*), and the pin (17*a*, 17*b*) can be moved between a pre-assembly position, in which the pin (17*a*, 17*b*) is in the bore (13) or in the recess (15*a*, 15*b*) with a larger overlap with respect to the final assembly position, and the final assembly position.
The special feature is that at least one holding element (18) can extend through a passage (31) in a seat (28) in such a way that the pin (17*a*, 17*b*) can be moved by the holding element (18) from the pre-assembly position into the final assembly position and that, in the final assembly position, the holding element (18) is positioned in such a way that it prevents a return movement of the pin (17*a*, 17*b*) from the final assembly position into the pre-assembly position.

10 Claims, 3 Drawing Sheets

(51) Int. Cl.
*F16C 11/04* (2006.01)
*F16C 11/02* (2006.01)
*B60N 2/02* (2006.01)
*B60N 2/90* (2018.01)
*E05D 3/12* (2006.01)
*E05D 5/10* (2006.01)

(52) U.S. Cl.
CPC .............. *F16C 11/02* (2013.01); *F16C 11/04* (2013.01); *F16C 43/02* (2013.01); *E05D 2005/102* (2013.01); *E05Y 2900/538* (2013.01); *F16C 2326/08* (2013.01)

(56) References Cited

U.S. PATENT DOCUMENTS

| | | | | |
|---|---|---|---|---|
| 2,369,148 A * | 2/1945 | Langhorst | ............. | E05D 7/1005 16/229 |
| 3,338,609 A * | 8/1967 | Banas | ....................... | E05D 7/10 16/229 |
| 3,908,227 A * | 9/1975 | Cain | ..................... | E05D 7/1011 16/229 |
| 3,924,293 A * | 12/1975 | Cain | ..................... | E05D 7/1011 16/380 |
| 4,178,657 A * | 12/1979 | Way, Jr. | ................. | E05D 7/1005 16/229 |
| 6,059,238 A * | 5/2000 | Reynolds | .................. | B60N 2/75 248/118 |
| 6,233,784 B1 * | 5/2001 | Daoud | .................. | E05D 7/1077 16/229 |
| 6,330,161 B1 * | 12/2001 | Smith | ..................... | G06F 1/181 16/225 |
| 8,115,098 B2 * | 2/2012 | Jones | .................... | E05D 7/1011 16/230 |
| 8,156,619 B2 * | 4/2012 | Bultschnieder | ......... | E05D 5/127 16/380 |
| 8,752,246 B2 * | 6/2014 | Inoue | .................. | H01M 2/1022 16/229 |
| 9,092,012 B2 * | 7/2015 | Dornhege | ................ | A44C 5/14 |

FOREIGN PATENT DOCUMENTS

FR 2468026 A1 4/1981
FR 2687133 A1 8/1993

* cited by examiner

VEHICULAR HINGE ASSEMBLY

FIELD OF THE INVENTION

According to a first aspect of the invention, the invention relates to a hinge. In terms of the invention, a hinge is an assembly comprising at least two parts that are connected to one another in such a way that they can be pivoted relative to one another about a pivot axis.

BACKGROUND OF THE INVENTION

A hinge is known from obvious prior use in which a first part is provided with a bore. Two pins are in the bore coaxially to the pivot axis and are axially movable. A spring is between the pins. In a second part, two recesses are aligned with one another and so as to be spaced apart from one another in such a way that the first part can be positioned relative to the second part such that the bore of the first part is aligned with the recesses of the second part and is positioned between the recesses.

The assembly occurs in that the two pins are compressed against the spring force, so that the first part can be in the assembly position. When the first part is in the assembly position, the pins are released, wherein the spring force in each case pushes a partial area of the longitudinal extension of each pin into the respective recess of the second part. The spring biases the pins against a stop of the bore. This stop is positioned, for example in such a way that the pins each extend approximately halfway into the bore of the first part and halfway into the recess of the second part.

The hinge needed to be improved insofar as the assembler was not able to check, whether the spring had in fact pushed the pin all the way to the stop into the recess of the second part. This is so, because there was the risk that the pin jammed or was not pushed all the way to the stop due to inaccurate fit. A secure connection of the first part with the second part was then not ensured.

OBJECT OF THE INVENTION

It was the object of the invention to create a hinge, in the case of which it is ensured that the pins are located in the intended position after assembly has occurred.

SUMMARY OF THE INVENTION

The object was solved by a hinge comprising a first part that can be pivoted relative to a second part about a pivot axis. The device can be, for example an equipment part of the vehicle interior. In terms of the invention, vehicle is a land-, air-, or watercraft. The hinge comprises at least one pin that is coaxial to the pivot axis. The hinge comprises, for example two pins that are coaxial to the pivot axis. The pin establishes the pivotable connection between the first part and the second part.

In a final assembly position, the pin has a first longitudinal portion at an end of a bore of the first part that is coaxial to the pivot axis. In terms of the invention, longitudinal portion refers to an area of the pin that extends along the longitudinal axis of the pin. A second longitudinal portion of the pin is in a recess of the second part that is coaxial to the pivot axis.

If the joint has, for example two pins, provision is also made, for example for two recesses. In this case, the bore is a through bore, for example or, in the alternative, two bores are formed in the first part.

In a pre-assembly position, the pin is recessed more in the bore than when in the final assembly position. The pin can be moved between the pre-assembly position and the final assembly position.

In the case that the device has only one movable pin, first positive-locking formation that can be engaged with second positive-locking formation of the second part in such a way that a pivoting of the first part relative to the second part is possible, can be fixed, for example on the first part. The first positive-locking formation can be formed, for example by a journal or protrusion that is integrally molded or attached to the first part and which can be engaged with a recess of the second part. The reverse alternative is also conceivable, according to which the journal or protrusion is integrally molded or attached to the second part, and the recess is formed on the first part. The first part can then be positioned, for example relative to the second part, in that the first positive-locking formation and the second positive-locking formation are engaged. While the pin is in the pre-assembly position, the bore is then aligned with the recess.

The hinge comprises at least one holding element. The holding element can extend through a passage in a seat. The passage ends in or crosses the bore or the recesses, e.g. The holding element cooperates with the pin. The holding element moves the pin from the pre-assembly position into the final assembly position. In the final assembly position, the holding element prevents the return movement of the pin into the pre-assembly position and holds the pin in the final assembly position, in which it is in the bore with a longitudinal portion and in the recess with a longitudinal portion.

It is not possible with the device according to the invention that the pin moves back into the pre-assembly position. In other words, every pin is held securely in the final assembly position. A secure connection between the first part and the second part is ensured. With respect to the device from the prior art, the pin can also have a larger length, because no space for a spring, which loads the pin, is required in response to the assembly, as it was required in the prior art.

The holding element, for example has at least one contact surface that cooperates with the pin. The holding element has, for example a first contact surface that cooperates with a first pin, and a second contact surface that cooperates with a second pin, to move the pins between the pre-assembly position and the final assembly position, and to prevent a return movement of the first pin and of the second pin from the final assembly position into the pre-assembly position.

The device comprises, for example at least two holding elements and at least two passages. A first holding element can be moved, for example through a first passage into a first seat, and a second holding element through a second passage into a second seat. The passage crosses the bore or the recess. The passage can thus be formed in the first part and/or in the second part.

According to an embodiment, the contact surface extends diagonally to an insertion direction of the holding element in such a way that the insertion force is partially diverted into a direction parallel to the pivot axis, so as to move the pin from the pre-assembly position into the final assembly position. In terms of the invention, diagonal means that the contact surface has an angle to the insertion direction. The angle can be, for example 45°. The holding element has, for example a first contact surface and a second contact surface. For example the contact surfaces have the same angle to the insertion direction. The pin is then displaced automatically from the contact surface of the holding element into the final assembly position in response to moving the holding element into its seat.

The contact surface and the further surface of the holding element are formed for example as an arrow with a point. The further surface of the holding element is, for example a second contact surface that cooperates with a second pin. In the alternative, the further surface can cooperate with a wall, for example a wall of the passage. When the pins are very close together or are in contact, for example in the pre-assembly position, it is possible to move the holding element between the pins by the tip, so that the contact surfaces come into contact with the pins.

For example the passage is formed in such a way that the insertion direction of the holding element runs approximately at right angles to the pivot axis. The insertion force can simply be deflected to the pin in this way and the assembly of the holding element can be carried out easily. If the device comprises two pins, the insertion force can be distributed evenly to both pins with simple means.

The device comprises a locking device, wherein the holding element is provided with at least one bolt formation, which each engage with a respective counter formation of the first part or of the second part, in particular releasably, when the holding element is locked. The locking device can be formed as detent device. The holding element is then automatically locked in its seat as soon as it is in its seat. The bolt formation is formed for example in the form of at least one spring arm. The counter formation can be, for example an undercut, which prevents the holding element from being moved out of the seat, as long as the spring arm engages with the undercut.

According to an embodiment of the invention, the contact surface is flexible. In this case, small manufacturing inaccuracies can be compensated. for example the holding element has two flexible contact surfaces. In any event, the flexible contact surface is formed in such a way, however, that the pin cannot be moved out of the recess beyond a critical overlap. The flexible contact surface can hold the pin in the final assembly position play-free. The pin can then not move or can only move slightly axially with respect to the pivot axis and can thereby cause noises, e.g. Provision can also be made radially to the pivot axis for a tighter fit, because the pin does not need to be moved into the final assembly position by the spring force. A radial play can thus also be prevented. The flexible contact surface can at the same time form the spring arm. In particular, every flexible contact surface forms a spring arm that cooperates with a counter formation.

The spring arm has for example positive-locking formation that can be engaged with positive-locking formation of a tool, so as to disengage the spring arm and the counter formation and so as to release the holding element from the seat. The positive-locking formation can, for example be formed by bores, into which journals of the tool can be moved.

The pin of the device is for example formed in a circular cylindrical. For example the recess is formed complementary. In the alternative, for example the pin can be formed to have a polygonal cross section in a first longitudinal portion and to have a cylindrical cross section in a second longitudinal portion, wherein the corresponding accommodation, i.e. the bore or the recess, then has a complementary shape. This embodiment ensures that a relative movement between the cylindrically formed longitudinal portion and the corresponding cylindrical accommodation occurs.

For example the recess has a stop for the pin. The final assembly position is reached when a contact surface of the pin comes into contact with the stop.

In the final assembly position, the pin is positioned, for example approximately with the same overlap to the first part and the second part. According to an alternative embodiment, however, the overlaps with the first part and with the second part can also differ from one another.

In the pre-assembly position, the pin is in the bore or in the recess, for example substantially completely. The installation space can be kept small in this way.

According to a second aspect, the invention also relates to a vehicle equipment part, such as a headrest, armrest or storage compartment comprising a hinged cover, comprising a hinge according to the first aspect of the invention. With regard to the features and advantages of the invention, reference is made to the first aspect of the invention.

In the case of a headrest, the second part can be, for example a base part that is supported on the backrest of a vehicle seat by support rods. The first part is, for example a control lever that supports a headrest part so as to be capable of being adjusted, for example pivoted, relative to the base part.

In the case of an armrest, the second part can be, for example a foot or a console that is secured to the vehicle, and the first part can be an armrest that can be moved relative to the foot, in particular pivoted.

In the case of a storage compartment, the second part can be formed by a covering that is secured to the vehicle, comprising a storage compartment provided therein. The first part can be formed by a pivotable hinged cover or cover for closing the storage compartment.

According to a third aspect, the invention relates to a method of assembling of a hinge.

Such a method is known from the prior art and has already been described above.

It was the object of the invention to create a method, whereby the device can be assembled easily and the parts of the hinge can be connected securely.

First of all, at least one pin is in at least one bore of a first part and/or in at least one recess of a second part. I.e., a pin is positioned, for example in the bore or in the recess. In the alternative, for example two pins are in a through bore or in two bores or in two recesses. In the alternative, a first pin could also be in the bore in the case of a bore/recess pair, and a second pin could be in the recess in the case of a further bore/recess pair.

The first part is then positioned relative to a second part in such a way that the at least one bore of the first part is coaxial to the pivot axis that is formed by the at least one recess of the second part. for example the bore of the first part is between two recesses of the second part that are aligned with one another, in such a way that a longitudinal axis of the bore is coaxial to a longitudinal axis of the recesses. In this case, the bore is for example a through bore.

The pin is subsequently moved from a pre-assembly position into a final assembly position, wherein, in the pre-assembly position, the pin is in the bore with a larger overlap with respect to the final assembly position. In the final assembly position, the pin has a first longitudinal portion at an end of the bore and with a second longitudinal portion in the recess, so that the first part can be pivoted relative to the second part about the pivot axis.

According to the invention, at least one holding element is moved through a passage, which ends in the bore or which crosses the latter, into a seat, to displace the pin between the pre-assembly position and the final assembly position and to secure the pin in the final assembly position. The holding element thereby moves the pin from the pre-assembly position into the final assembly position. If the device comprises two pins, both pins are moved from the pre-assembly position into the final assembly position in response to the movement of the at least one holding element into its respective seat.

A simple assembly is ensured with these features, because the pin does no longer need to be held in the bore against the spring force during the assembly. The positioning of the first part relative to the second part in the pre-assembly position is simplified, because the pin does not need to be held in the bore or in the recess against a spring force. A secure connection between the first part and the second part can furthermore be ensured by the method. This is so, because if the holding part is located in its seat and if the pin is in the final assembly position, it can no longer move back into the pre-assembly position.

BRIEF DESCRIPTION OF THE DRAWING

Further advantages follow from an embodiment that is illustrated schematically in the FIGS.

The device as a whole is identified with reference numeral 10 in the figures. Identical reference numerals in the different figures identify corresponding parts, even if followed by lowercase letters or if lowercase letters are omitted.

SPECIFIC DESCRIPTION OF THE INVENTION

Figure 1:
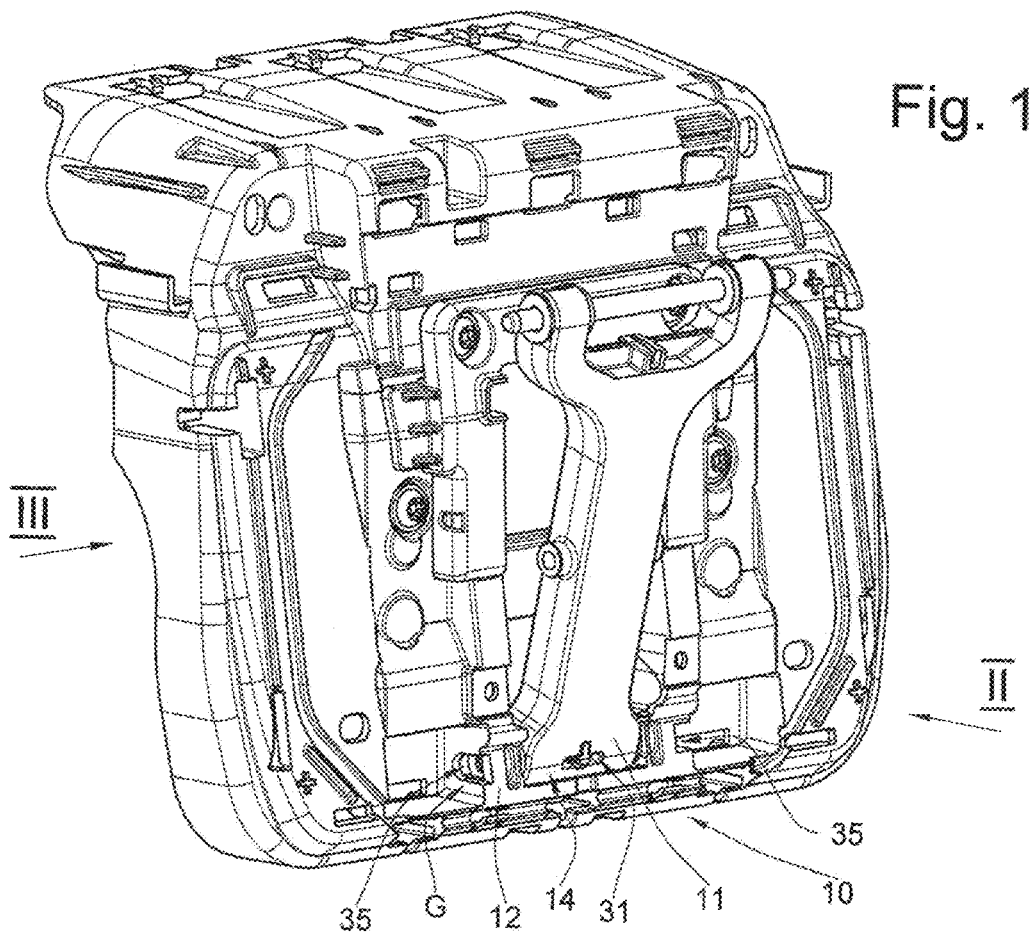
FIG. 1 shows a perspective view of the hinge.
Figure 2:
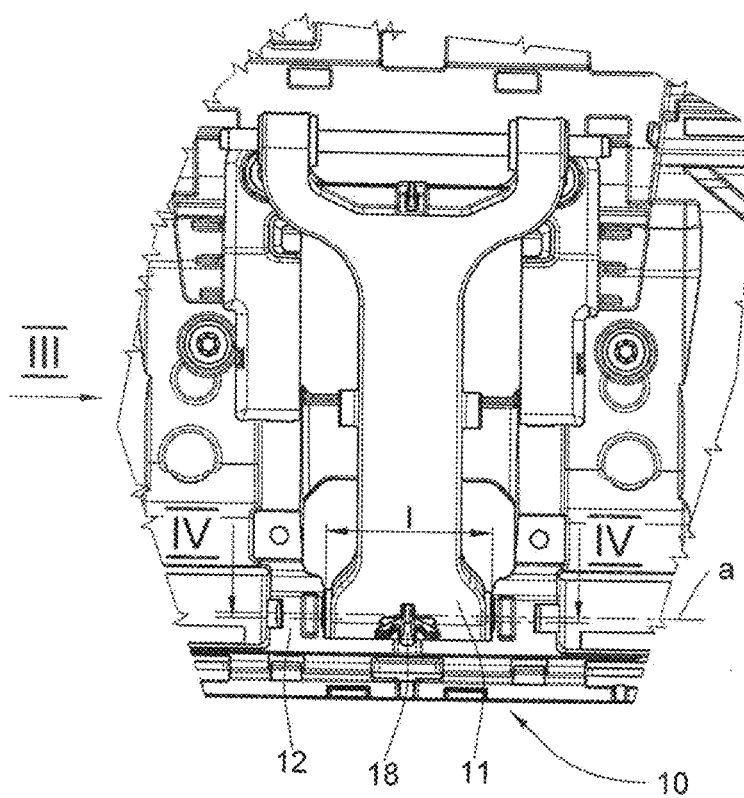
FIG. 2 shows a front view of the hinge.

According to FIGS. 1 to 3 and 6, the device 10 comprises a first part 11 that can be pivoted relative to a second part 12 about a pivot axis between a first position and a second position. The first part 11 and the second part 12 form a joint G.

The first part 11 is provided with a continuous bore 13. The bore is formed on an end area 14 of the first part 11.

The second part 12 is provided with two recesses 15a and 15b that are spaced apart from one another and which are coaxial to the pivot axis a. The recesses 15a and 15b have a distance 1 from one another. Each bore 15a and 15b is provided with an axial stop 16. The end area 14 of the first part 11 is between the recesses 15a and 15b. The bore 13 is aligned with the recesses 15a and 15b and is thus also coaxial to the pivot axis a.

A first pin 17a is in the bore 13 with a first longitudinal portion and in the recess 15a with a second longitudinal portion. In addition, a second pin 17b is in the bore 13 with a first area and in the recess 15b with a second area. The stop 16a prevents a further movement of the pin 17a in the direction $y_2$ and the stop 16b prevents a further movement of the pin 17b in the direction $y_1$. A front face 34 of the pin 17a cooperates with the stop 16a, and a front face 34 of the pin 17b cooperates with the stop 16b.

In the present embodiment, the pins 17a and 17b are formed circular cylindrically. The recesses are also formed circular cylindrically. A pivotable connection between the first part 11 and the second part 12 is created by the pins 17a and 17b.

A holding element 18 is in a seat 28 between the pins 17a and 17b. A passage 31 comprising an opening 30, through which the holding element 18 can be moved into the seat 28 from the outside in the direction $x_1$, is further formed in the first part 11. The passage 31 crosses the bore 13. The passage 31 is formed in such a way that the insertion direction $x_1$ of the holding element 18 is positioned approximately perpendicular to the pivot axis a.

The holding element 18 has contact surfaces 19a and 19b that, starting from a tip 20, are formed as an arrow. The contact surface 19a forms an angle α with an insertion direction $x_1$, and the contact surface 19b also forms an angle α with the insertion direction $x_1$. The contact surfaces 19a and 19b are formed on flexible arms 21a and 21b of the holding element 18. The holding element 18 is made of a resilient material, in the present embodiment of plastic.

Recesses 23a and 23b are formed between the arms 19a and 19b and a base 22 of the holding element 18. The arm 21a can thus deform elastically from the illustrated position in the direction $y_1$, and the arm 21b can deform in the direction $y_2$. Each arm 21a and 21b is provided with first positive-locking formation 24 that latches with second positive-locking formation 25 of the first part 11. In the present embodiment, the first positive-locking formation 24 are formed by a bolt surface 26, and the second positive-locking formation 25 are formed by a wall surface 27 of the bore 13.

When the holding element 18 is located in the seat 28, the arms 21a and 21b move in engagement with the wall surface 27, so that a movement in the direction $x_2$ is prevented. The contact surfaces 19a and 19b further bear against a reveal 29 of an opening 30 of the first part 11 in such a way that a movement in the direction $x_1$ is prevented. The contact surface 19a also extends at right angles to the bore 13 in such a way that a movement of the pin 17a in the direction $y_1$ is prevented. The contact surface 19b furthermore extends at right angles to the bore 13 in such a way that a movement of the pin 17b in the direction $y_2$ is prevented.

Figure 3:
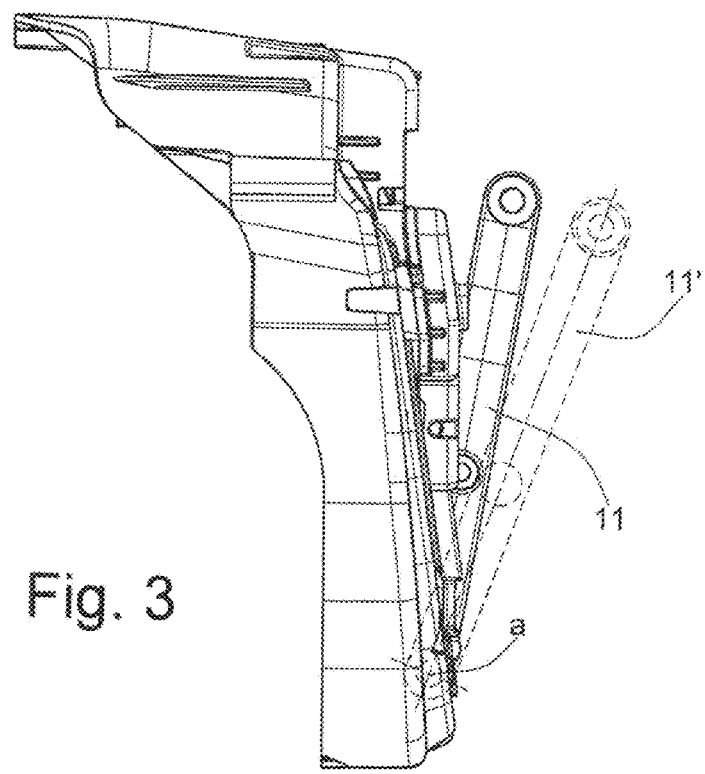
FIG. 3 shows a side view of the device according to the elevation arrows III in FIG. 1 and FIG. 2.

A joint G that securely prevents a release of the first part 11 from the second part 12, is formed in this way. The first part 11 can be positioned in different pivot positions relative to the second part 12. In FIG. 3, the first part is shown with solid lines in a first pivot position and is identified with 11 and is shown with dashed lines in a second pivot position and is identified with 11'.

When the holding element 18 is located in the seat 28, it is ensured that the pins 17a and 17b have sufficient overlap with the first part 11 and with the second part 12. An elastic deformation of the arm 21a in the direction $y_1$ (see FIG. 6) also does not allow the pin 17a to move in the direction $y_1$ to the extent that a sufficient connection between the first part 11 and the second part 12 would not be ensured. In the case of an elastic deformation of the arm 21b in the direction $y_2$, it would be ensured analogously that the pin 17b is in the recess 15b with sufficient length to maintain a secure connection between the first part 11 and the second part 12.

The assembly of the device will be described below. The pins 17a and 17b are in the bore 13 in a pre-assembly position (see FIG. 4). In the pre-assembly position, the pins 17a and 17b are, for example completely recessed in the bore 13. The bore 13 is brought between the recesses 15a and 15b in such a way that it is aligned with the recesses. Provision is made on the second part 12, for example for at least one auxiliary stop, wherein the first part 11 is automatically in the correct position, when the first part bears against the stop.

Figure 4:
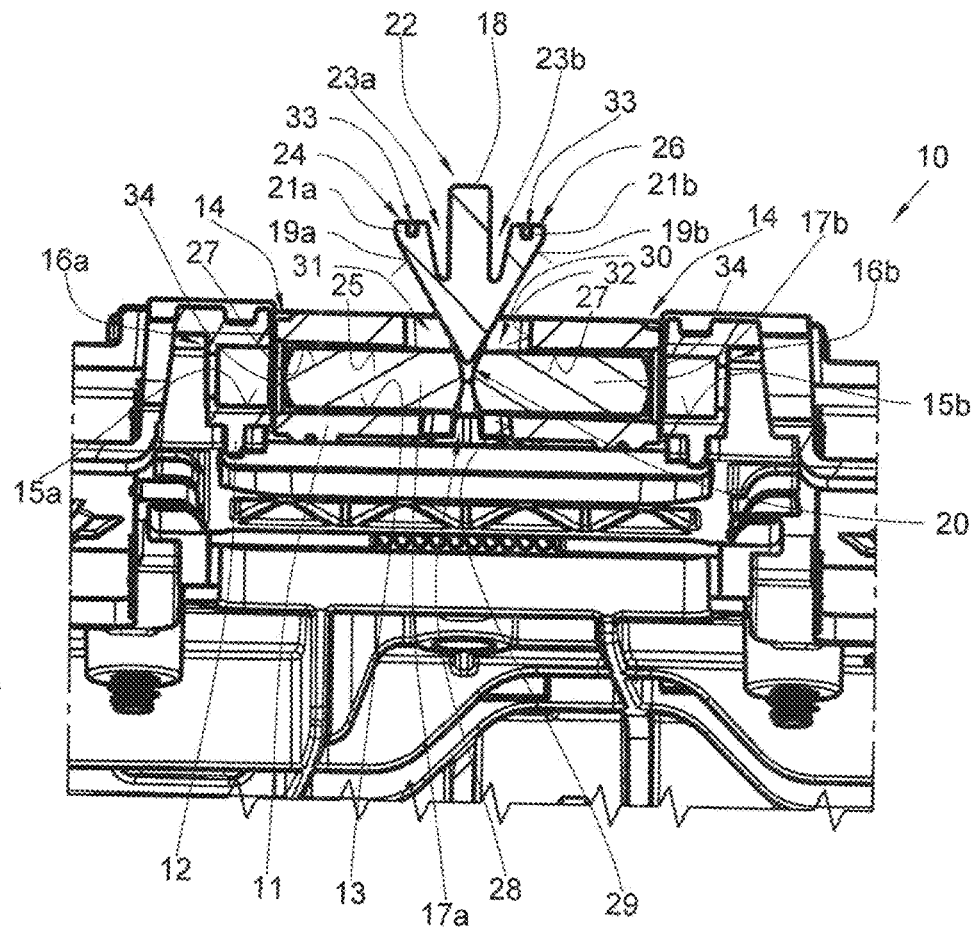
FIG. 4 shows a sectional view of the device in the pre-assembly position according to sectional line IV-IV in FIG. 2.
Figure 5:
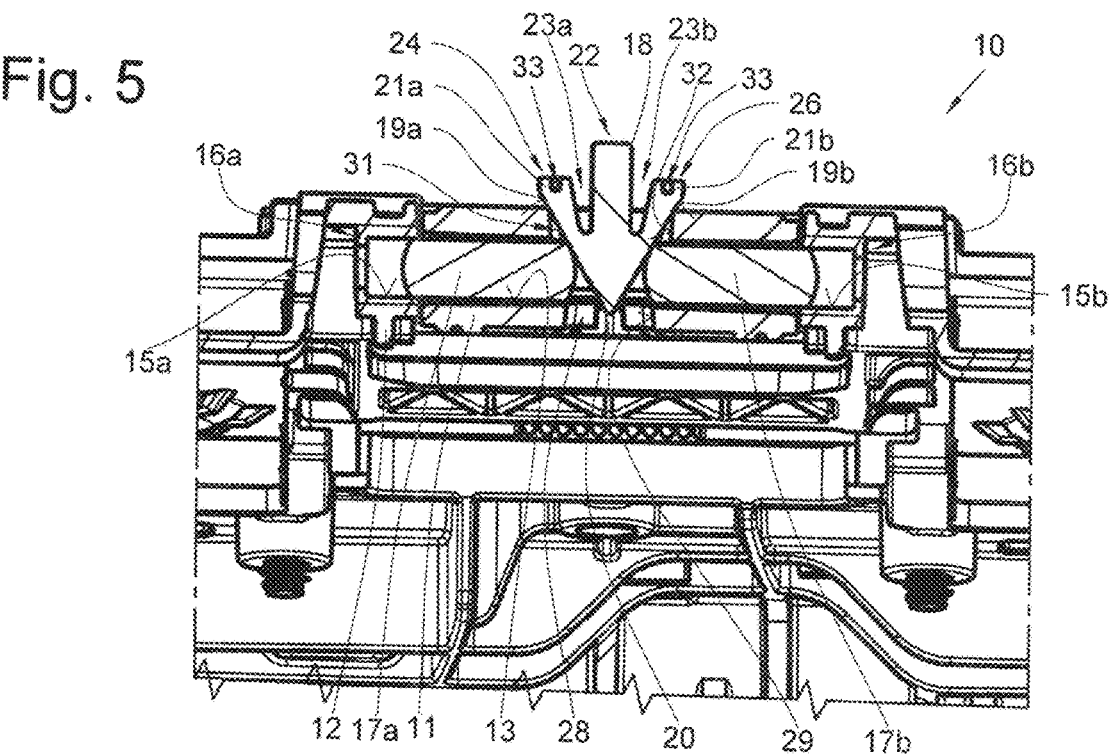
FIG. 5 shows the device in line with FIG. 2, wherein a holding element is moved into a seat of the first part to establish the joint connection.
Figure 6:
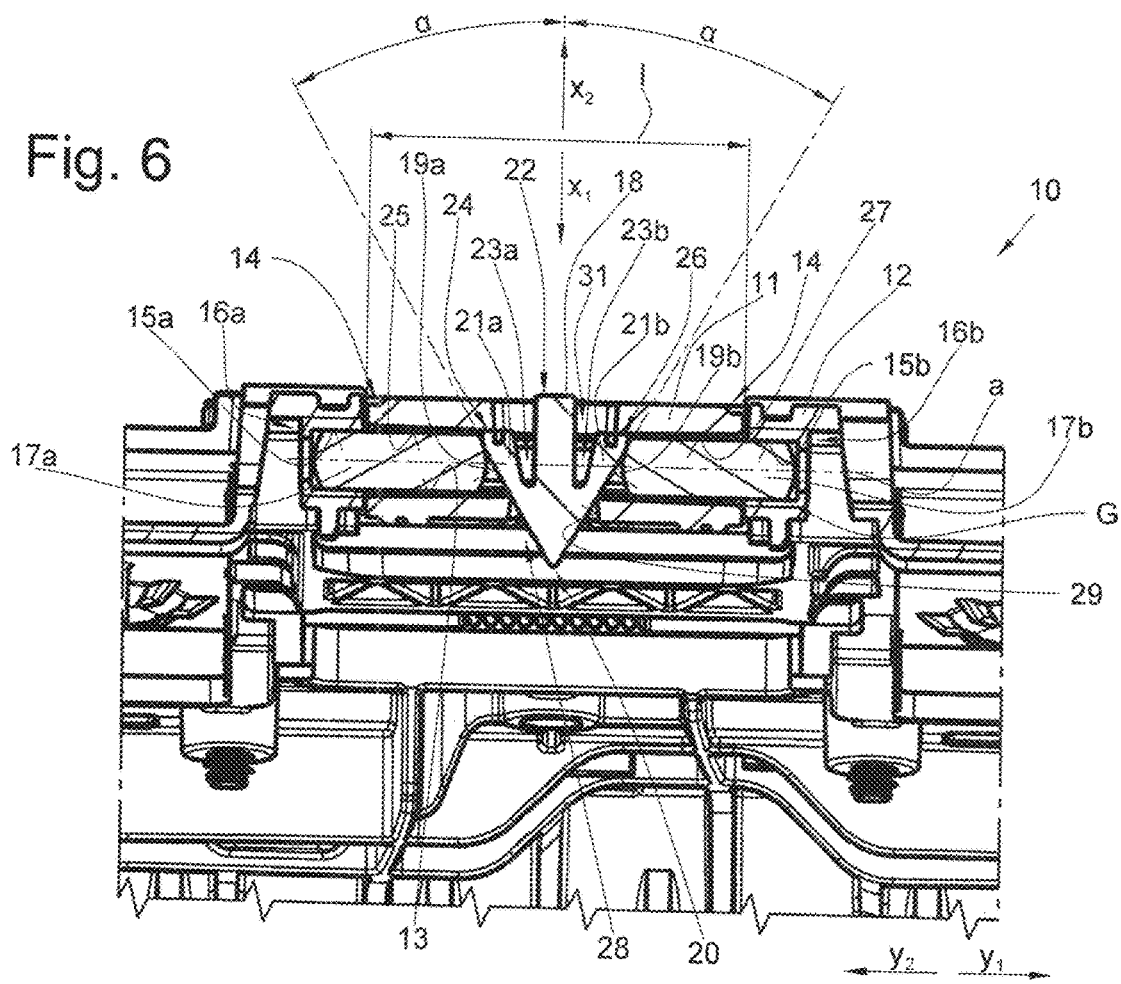
FIG. 6 shows the device in line with FIG. 5 in a final assembly position, wherein the holding element is in the seat of the first part.

The holding element 18 is then inserted into the passage 31 through the opening 30 in the direction $x_1$, so that the tip 20 engages between the pins 17a and 17b (see FIG. 4). In response to onward movement of the holding element 18 in the direction $x_1$, the pin 17a is moved from the contact surface 19a in the direction $y_2$, and the pin 17b is moved from the contact surface 19b in the direction $y_1$ (see FIG. 5). Free end areas of the arms 21a and 21b are thereby deformed from an inner surface 32 of the passage 31 to the base 22.

When the holding element 18 is located in the seat 28 (see FIG. 6), the arms 21a and 21b can move back into their original shape again, prompted by the restoring force, and then engage behind the wall surface 27 in such a way that the holding element 18 can no longer move in the direction $x_2$. The bolt surface 26 of each arm 21a and 21b then bears against the wall surface 27. A secure articulated connection is then present between the first part 11 and the second part 12.

To release the holding element 18, protrusions of a unillustrated tool engage with recesses 33 of the holding element 18. The recesses are formed for example by bores, with which the protrusions of the tool engage. A non-illustrated thread, to which the tool is screwed to move the holding element 18 out of the seat 28 in the direction $x_2$, can be formed in the base 22. The arms 21a and 21b are then moved in the direction of the base 22 and the holding element 18 is moved out of the passage 31 in the direction $x_2$.

The pins 17a and 17b are subsequently moved into the bore 13 in such a way that they lose their overlap with the recesses 15a and 15b. For this purpose, recesses 35, which make it possible to move the pin 17a in the direction $y_1$ and to move the pin 17b in the direction $y_2$, are formed in the first part 11. The first part 11 and the second part 12 can then be disassembled from one another.

The invention claimed is:

1. A hinge comprising:
   a first part formed with a bore;
   a second part pivotable relative to the first part about a pivot axis and formed with a recess;
   a pin that, in a final assembly position, is coaxial to the pivot axis and has a first portion in the bore and a second portion in the recess, the pin being movable between a preassembly position in which the pin is more deeply recessed in the bore or in the recess than in the final assembly position;
   a holding element extending through a passage of the first part into a seat of the first part so as to slide the pin from the preassembly position into the final assembly position and so that, in the final assembly position, the holding element is positioned in such a way as to prevent a return movement of the pin from the final assembly position into the pre-assembly position, the holding element being formed with a contact surface that cooperates with the pin and extends at an acute angle to an insertion direction of the holding element in such a way that a part of the insertion force is diverted into a direction parallel to the pivot axis so as to slide the pin from the preassembly position into the final assembly position, the contact surface of the holding element and another contact surface of the holding element are positioned relative to one another to form an arrow shape with a point;
   a first locking formation on the holding element; and
   a second locking formation on one of the first and second parts engaging the first locking formation and retaining the holding element in the seat when inserted therein.

2. The hinge according to claim 1, wherein the hinge comprises two of the recesses and two of the pins, the pins each having, in the final assembly position, a respective first portion in the bore and with a respective second portion in a respective one of the recesses.

3. The hinge according to claim 1 wherein a contact surface that cooperates with the pin, is formed on the holding element, and the contact surface is elastic.

4. The hinge according to claim 1, wherein the passage is positioned in such a way that the insertion direction is generally perpendicular to the pivot axis.

5. The hinge according to claim 1, wherein the pin is cylindrical.

6. The hinge according to claim 1, wherein the recess and/or the bore has a stop for the pin.

7. A hinge according to claim 1, wherein the hinge is part of a headrest, an armrest or a storage compartment of a vehicle comprising hinged cover.

8. A hinge comprising:
   a first part formed with a bore;
   a second part pivotable relative to the first part about a pivot axis and formed with a first recess and a second recess axially flanking the first part, axially confronting each other, and extending coaxial with the bore;
   respective first and second pins that, in a final assembly position, are coaxial to the pivot axis and each have a first portion in the bore and a second portion in a respective one of the recesses, the pins being movable between preassembly positions in which the pins are more deeply recessed in the bore or in the respective recess than in the final assembly position; and
   an arrow-shaped holding element extending through a passage of the first part into a seat of the first part and having first and second elastically deformable arms having angled contact surfaces engageable with the pins so as to slide the pins from the preassembly position into the final assembly position and so that, in the final assembly position, the holding element is positioned in such a way as to prevent a return movement of the pins from the final assembly position into the preassembly position, rear ends of the arms each forming a respective first positive-locking formation, the first part forming a second positive-locking formation, the passage and seat both being formed in the first part.

9. The hinge according to claim 1 wherein in the final-assembly position the pin is wholly recessed in the bore.

10. A hinge comprising:
    a first part formed with a bore;
    a second part pivotable relative to the first part about a pivot axis and formed with a recess;
    a pin that, in a final assembly position, is coaxial to the pivot axis and has a first portion in the bore and a second portion in the recess, the pin being movable between a pre-assembly position in which the pin is more deeply recessed in the bore or in the recess than in the final assembly position;
    a holding element extending through a passage of the first part into a seat of the first part so as to slide the pin from the pre-assembly position into the final assembly position and so that, in the final assembly position, the holding element is positioned in such a way as to prevent a return movement of the pin from the final assembly position into the pre-assembly position;

a first locking formation formed as a spring arm on the holding element; and a second locking formation on one of the first and second parts engaging the first locking formation and retaining the holding element in the seat when inserted therein, the spring arm having positive locking formation engageable with positive locking formations of a tool for disassembly of the holding element.

\* \* \* \* \*